Patented Dec. 31, 1929

1,741,472

UNITED STATES PATENT OFFICE

RICHARD MICHEL, OF UERDINGEN-ON-THE-RHINE, GERMANY, ASSIGNOR TO I. G. FARBENINDUSTRIE AKTIENGESELLSCHAFT, OF FRANKFORT-ON-THE-MAIN, GERMANY

MANUFACTURE OF ETHYLATED NAPHTHALENES

No Drawing. Application filed January 25, 1927, Serial No. 163,578, and in Germany February 4, 1926.

The present invention relates to a process for the manufacture of condensation products from naphthalene, partially hydrogenated naphthalenes and other naphthalene derivatives, and to new products obtainable thereby.

I have found that by causing ethylene to react upon unsaturated naphthalene hydrocarbon compounds in the presence of catalytically acting substances at temperatures between about 50 to about 200° C., and under super-atmospheric pressure, there are obtainable, according to the operating conditions, mono- or poly-ethylated napthalene compounds or higher condensation products of the latter.

As catalytically acting substances which are capable of promoting the aforesaid reaction, metallic chlorides, particularly aluminium chloride and iron chloride, have been found to be particularly effective. With either of these reaction promoters there may be combined also other substances capable of promoting the reaction, such as for instance benzene hydrocarbons and hydrogen-halogenides. According to the literature, only a mono-ethyl naphthalene is hitherto known. By the application of my new process there are obtainable, besides mono-ethyl-napthalene, substances of a higher boiling point which apparently are poly-ethyl-naphthalenes. Finally, by more intensified action, condensation products are obtainable in the form of highly viscous, strongly fluorescent oils. The reaction between ethylene and partially hydrogenated naphthalenes proceeds in an analogous manner.

The following examples are intended to illustrate my invention without limiting it thereto.

The following examples serve to illustrate the principles underlying my invention, which as already stated can be carried out within very wide limits:—

*Example 1.*—In an autoclave of 300 litres capacity 128 kg. of naphthalene and 4 kg. of aluminium chloride are stirred for about 4 hours with ethylene under a pressure of 20 atmosperes at from 100 to 200° C. The reaction is advantageously introduced by passing a small quantity of hydrochloric acid gas into the reaction mixture. The consumed ethylene is constantly replaced until 38 kg. have been absorbed. After cooling and removal of the aluminium chloride distillation is effected. The first runnings contain benzine, then 25 kg. of unchanged naphthalene distil over and then 110 kg. of oily product, while 25 kg. of an undistillable residue will remain. The oily portion boils under ordinary pressure between 250 and 400° C. and consists of a mixture of β mono-ethyl naphthalene, di- and poly-ethyl naphthalenes and binaphthyl derivatives. The quantities of these products are influenced by different variations of the above called conditions.

*Example 2.*—132 kg. of tetrahydronaphthalene are caused to act with ethylene in a similar manner in the presence of 2 kg. of aluminium chloride at 100° C. under superatmospheric pressure. An oil, boiling between 240° C. and 340° C. is thus obtained together with a small quantity of nonvolatile products. Instead of aluminium chloride iron chloride and other suitable metal chlorides may be used with similar effect.

In the following claims the term "an unsaturated hydrocarbon of the naphthalene series" is intended to comprise all hydrocarbons of the naphthalene series, including their homologs, with the exception of the completely saturated hydrocarbons of the naphthalene series which correspond to the following general formula:

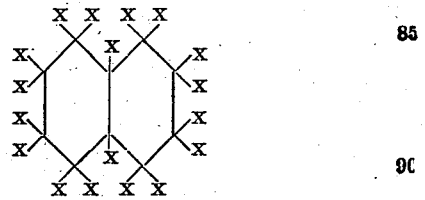

wherein X represents hydrogen or a monovalent substituent. The completely saturated hydrocarbons of the naphthalene series have been found to be inoperative in my process.

I claim:—

1. The process which comprises reacting with ethylene upon an unsaturated naphthalene hydrocarbon compound in the presence of a catalytically acting metal halide under superatmospheric pressure at temperatures of about 50 to about 200° C.

2. The process which comprises reacting with ethylene upon an unsaturated naphthalene hydrocarbon compound in the presence of a catalytically acting metal chloride under a pressure of about 20 atmospheres and a temperature of about 50 to 200° C.

3. The process which comprises reacting with ethylene upon naphthalene in the presence of aluminium chloride under a pressure of about 20 atmospheres at a temperature of about 100 to about 200° C.

4. The process which comprises reacting with ethylene upon naphthalene in the presence of aluminium chloride under a pressure of about 20 atmospheres at a temperature of from about 50 to about 200° C.

In testimony whereof I have hereunto set my hand.

RICHARD MICHEL.